United States Patent [19]
Moore

[11] Patent Number: 5,461,361
[45] Date of Patent: Oct. 24, 1995

[54] AUTOMOTIVE INSTRUMENT PANEL APPARATUS

[75] Inventor: Thomas S. Moore, Northville, Mich.

[73] Assignee: Chrysler Corporation, Highland Park, Mich.

[21] Appl. No.: 209,837

[22] Filed: Mar. 11, 1994

[51] Int. Cl.$^6$ ........................................ B60Q 1/00
[52] U.S. Cl. .................. 340/461; 340/980; 359/15; 359/630; 353/14; 345/7
[58] Field of Search ........................ 340/438, 980, 340/705, 461; 345/7–9; 359/630, 15; 353/14

[56] References Cited

U.S. PATENT DOCUMENTS

| | | |
|---|---|---|
| 4,635,033 | 1/1987 | Inukai et al. |
| 4,687,072 | 8/1987 | Komuro. |
| 4,831,366 | 5/1989 | Iino ............................ 340/980 |
| 4,908,611 | 3/1990 | Iino ............................ 340/980 |
| 4,973,942 | 11/1990 | Iino. |
| 5,028,912 | 7/1991 | Iino ............................ 340/980 |
| 5,059,956 | 10/1991 | Iino ............................ 340/980 |
| 5,204,666 | 4/1993 | Aoki et al. ...................... 340/980 |

FOREIGN PATENT DOCUMENTS

| | | |
|---|---|---|
| 61-57434 | 3/1986 | Japan. |
| 1103544 | 4/1989 | Japan. |
| 2197429 | 8/1990 | Japan. |

Primary Examiner—Brent Swarthout
Assistant Examiner—Nina Tong
Attorney, Agent, or Firm—Christopher A. Taravella

[57] ABSTRACT

An instrument panel projection apparatus is mounted on a pivotable steering column or the ceiling of the vehicle. A small steering wheel, preferably no more than twelve inches in diameter, is also mounted on the steering column. The instrument panel image is projected onto a reflection plate. The steering wheel, reflection plate and the instrument panel cluster are positioned so that the driver's sight line for viewing the image of the instrument panel cluster is over the steering wheel. Further, when the steering column is pivoted or telescoped, the steering wheel and the instrument panel cluster are also pivoted and telescoped, so as to continue to provide a sight line for viewing the instrument cluster over the steering wheel. The projection apparatus may include a lens system with a magnifying lens to increase the size of the projected image.

20 Claims, 2 Drawing Sheets 5,461,361

AUTOMOTIVE INSTRUMENT PANEL APPARATUS

BACKGROUND OF THE INVENTION

The present invention relates to an automotive instrument panel apparatus and, more particularly, to the use of a small image display means mounted on a pivotable steering column. This arrangement provides a visual image of an automobile's operating status on a reflection surface located in front of the driver in such a manner that the driver can see the reflected image over the steering wheel.

Conventional automotive instrument panels provide the driver with operating status information in the form of dials and gauges which are arranged so that the typical operating driver views them through the steering wheel. The panel when viewed in this manner is partially obstructed by the steering wheel. See for example U.S. Pat. No. 4,635,033. Further, if the steering wheel or steering column is pivotable, the portion of the panel that is obstructed changes depending on the angle of the steering column because the position of the panel relative to the driver's eyes is fixed.

U.S. Pat. No. 4,973,942 to Iino discloses an instrument panel cluster that is viewed through the steering wheel. An indicating device is mounted in the steering wheel column and displays information concerning the operating status of the vehicle. This display is reflected onto a reflecting display surface in the dashboard and from there through the steering wheel to the driver's field of view, thus enabling the driver to see the information through the steering wheel as a virtual image. This arrangement also includes a cylindrical magnifying lens installed in such a way that the reflecting display surface is within the focal length of the lens and the virtual image is formed further away from the driver's view point and is magnified, making the display easier to read.

Japanese application No. 64-15724 discloses a projection system mounted to the roof of a vehicle such that operating information may be displayed on a pad at the center of the steering wheel.

In Japanese application No. 62-261165 there is disclosed an instrument panel pivotably mounted on the steering column whose display is projected off the windshield over the steering wheel to the driver. Similarly, in Japanese application 59-182248 a display device mounted behind the steering wheel has an upper portion of its image reflected off a mirror onto the windshield and from there to the driver to create a heads-up display. The lower portion of the display image is viewed through the steering wheel.

SUMMARY OF THE INVENTION

The present invention is directed to providing a driver with an unobstructed view of car status information by mounting a virtual image instrument cluster on a steering column with a small diameter wheel so the cluster can pivot to different positions with tilting of the column and can be viewed over the small steering wheel.

According to an illustrative embodiment of the present invention, a virtual image instrument panel cluster is mounted on a pivotable steering column. A small steering wheel, preferably twelve inches in diameter, is mounted on the steering column. The steering wheel and the instrument panel cluster are positioned so that the driver's sight line for viewing the instrument panel cluster is over the steering wheel. Further, when the steering column is pivoted, the steering wheel and the instrument panel cluster are also pivoted, continuing to provide a sight line for viewing the instrument cluster over the steering wheel.

In a preferred embodiment, an image of the instrument cluster is projected through a lens system onto a reflection surface positioned in front of the driver so that the driver can view the reflected image over the steering wheel. The lens system includes a magnifying lens to increase the size of the projected image.

In another embodiment, the instrument cluster or image source is mounted on the ceiling of the car and projected through the lens system onto a reflection surface, and from there over the steering wheel to the eyes of the driver.

BRIEF DESCRIPTION OF THE DRAWINGS

The foregoing and other features of the present invention will be more readily apparent from the following detailed description of preferred embodiments taken in conjunction with the attached drawings wherein.

DETAILED DESCRIPTION OF PREFERRED EMBODIMENTS

Figure 1:
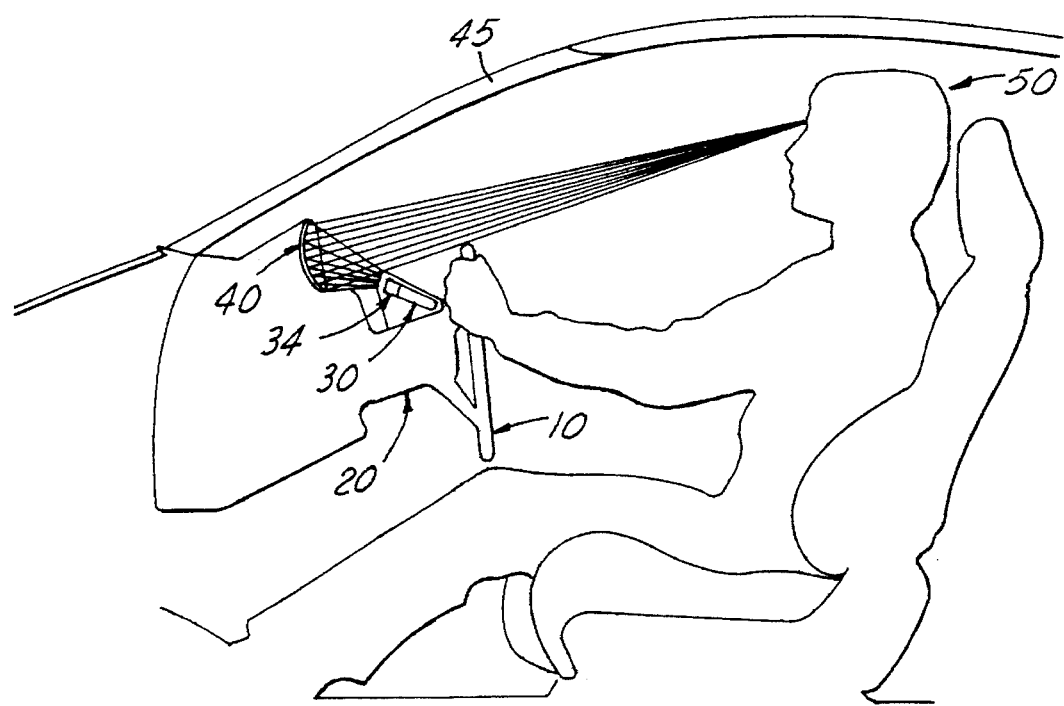
FIG. 1 is a diagrammatic view of a first preferred embodiment of the instrument panel apparatus of the present invention.

FIG. 1 illustrates a preferred embodiment of the instrument panel apparatus of the present invention. A small diameter steering wheel 10 is mounted on a steering column 20. For example, the steering wheel may be 12 inches in diameter from top to bottom when in the straight ahead position of rotation. This makes it easier to project an image over the steering wheel. An image source or instrument cluster 30 is mounted on the top portion of steering column 20. The image source displays vehicle operating status information such as the vehicle speed. Image source 30 may be a small TV projector and may use a small color liquid crystal display (LCD) or a small color cathode ray tube (CRT) to project an image of the status information through a lens system 34 to a reflecting surface or plate 40.

The lens system 34 is positioned between the image source 30 and the reflecting plate 40, and includes a magnifying lens to magnify the image displayed by the image source 30 to a size much larger than the image displayed by the image source. The image is magnified to a size fitting the reflecting plate 40. A preferred lens is made by net finish injection molding of polycarbonate plastics material. This results in a much cheaper projector.

Use of the lens allows the size of the projection to be reduced which makes it easier to locate in the vehicle. For example, it may only need to be 5 inches across instead of 20 inches, and 2 inches high instead of 8 inches. This reduced cross sectional form factor also has the effect of reducing the weight of the projector.

The driver 50 sees the surface of the reflection plate 40 over the top of the steering wheel 60. FIG. 1 illustrates the driver's sight line 60 to the image reflected on reflection plate 40. This provides the driver with an unobstructed view of the instrument panel cluster, while not relying on reflection from the windshield 45 which can result in a poor image.

Figure 2:
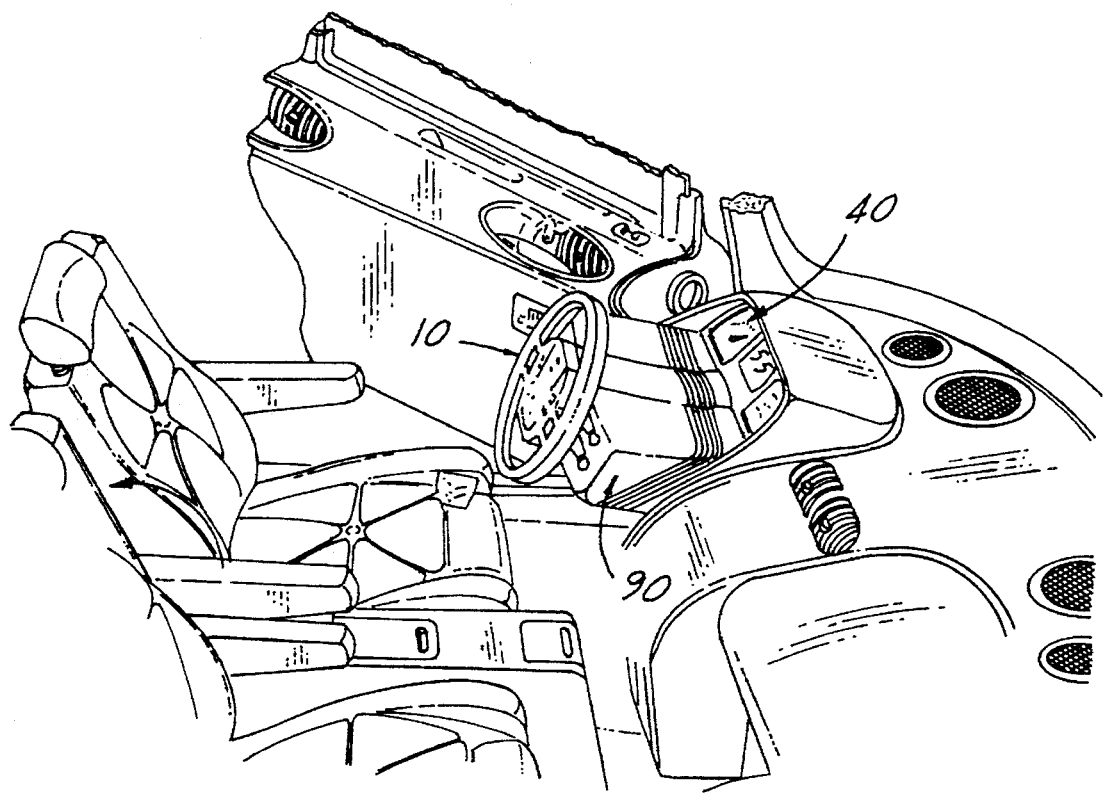
FIG. 2 is a perspective view of the first preferred embodiment of the instrument panel apparatus of the present invention.

FIG. 2 illustrates a perspective view of the preferred embodiment of the instrument panel apparatus mounted within a car. A housing 90 covers the steering column 10 and the image source 30. Further, the surface of the reflection plate 40, also within housing 90, is viewed by the driver through openings in the housing 90, which may be covered by a transparent material or a lens.

Figure 3:
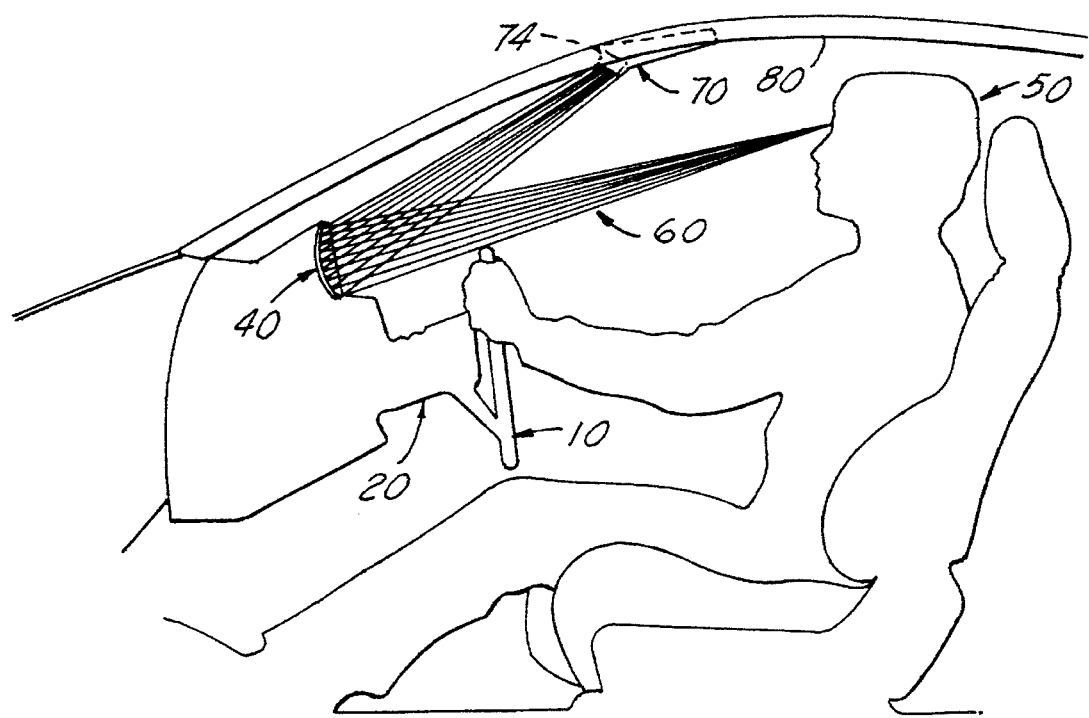
FIG. 3 is a diagrammatic view of a second preferred embodiment of the instrument panel apparatus of the present invention.

FIG. 3 illustrates a second embodiment of the instrument panel apparatus. Here, an image source 70 is mounted to the ceiling 80 of the car. Image source 70 projects an image of the information on the operating status of the vehicle through a lens system 74 to reflecting plate 40. The driver's sight line 60 to the image on the reflection plate 40 is over the steering wheel 10.

Figure 4:
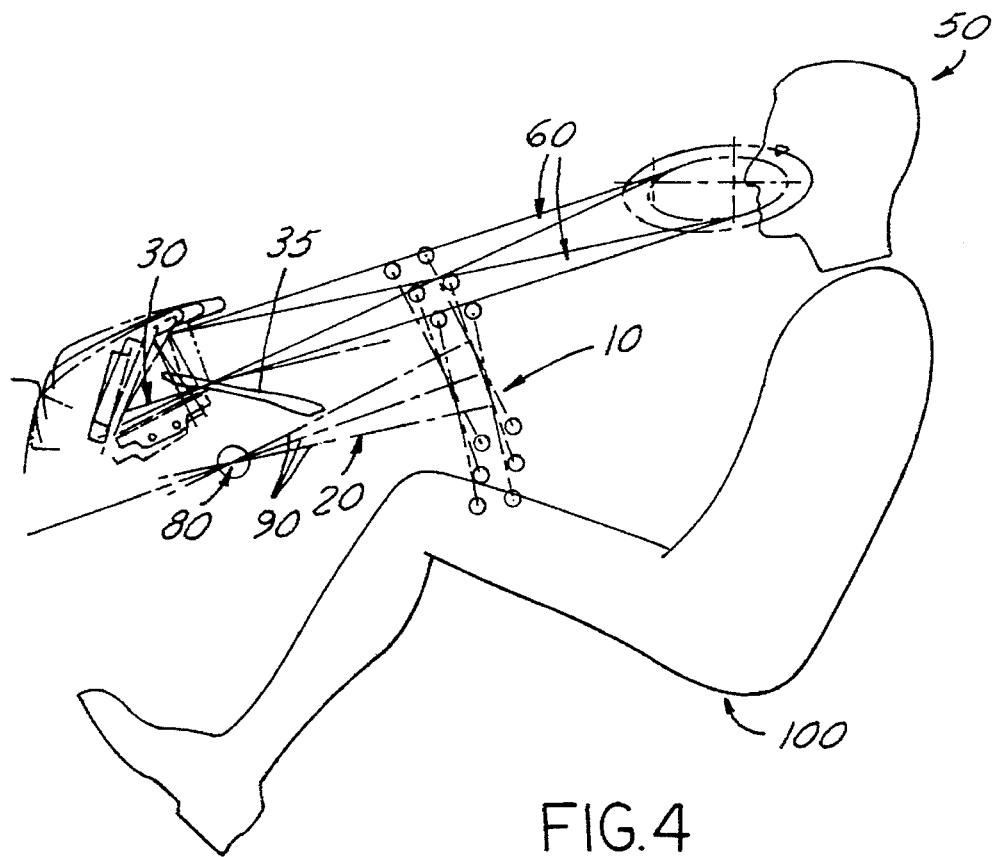
FIG. 4 is a diagrammatic view of the first preferred embodiment of the instrument panel apparatus as it is pivoted.

FIG. 4 illustrates how the instrument panel cluster 30 is viewed over the steering wheel 10 by the driver 50 as steering column 20 is pivoted about a low pivot point 80. Driver 50 can set the position of steering column 20 so that it is comfortable. By means of a linkage 35, either mechanical or electrical, the instrument panel cluster, at least the reflecting surface thereof, moves with the steering wheel so that an unobstructed view 60 of instrument panel cluster 30 is maintained. As shown in FIG. 4, steering column 20 may be pivoted or telescoped to a variety of positions 90 and still provide driver 50 with an unobstructed view 60 of the instrument panel cluster 70. Since the lens allows the display to be small in size, it does not add much mass to the steering column and therefore does not have a detrimental effect on the vibration characteristic of the column.

The combination of the pivoting display, low pivot tilt column, small diameter steering wheel and driver "H" point location 100 on the seat, are coordinated to permit the over-the-wheel viewing characteristics of the present invention. The advantages of this approach are that the driver has a completely unobstructed view of the vehicle instrumentation. The image is not viewed through the steering wheel, but over it. Because the instrumentation appears over the wheel on a reflecting surface, the intensity of the image is greater than it would be if reflected from the windshield. Also, a heads-up display on the windshield partially blocks the driver's view of the road. Having the instrumentation appear as in the present invention minimizes the driver's eye time off the road, which enhances safety.

While FIG. 4 shows the movement of reflection plate 40 with the pivoting and telescoping of the steering column, it should be understood that the reflection plate 40 shown in FIG. 3 could also be made to pivot with the column to provide the same unobstructed view.

While the present invention has been particularly shown and described with reference to preferred embodiments thereof, it will be understood by those skilled in the art that various changes in form and details may be made therein without departing from the spirit and scope of the invention.

What is claimed is:

1. In a vehicle having a steering column with a steering wheel mounted thereon and a front windshield, an operating condition display comprising:

an image source for projecting an image of information indicating vehicle operating conditions toward the windshield, said image source being mounted outside a line of sight of a driver through the windshield; and a reflection plate positioned between the windshield and steering wheel to intercept and reflect the entire projected image of information over the steering wheel to the driver's line of sight;

wherein said steering column is pivotable and further including a linkage between said reflection plate and said steering column arranged so that said reflection plate pivots with said steering column so as to maintain the reflection of the entire projected image over the steering wheel.

2. The display of claim 1 wherein said steering column telescopes in addition to being pivotable.

3. The display of claim 2 wherein said image source is mounted on said steering column adjacent to said steering wheel.

4. The display of claim 2 wherein said image source is mounted on a ceiling of the vehicle.

5. The display of claim 1 wherein said image source is mounted on said steering column adjacent to said steering wheel.

6. The display of claim 1 wherein said image source is mounted on a ceiling of the vehicle.

7. In a vehicle having a steering column with a steering wheel mounted thereon and a front windshield, an operating condition display comprising:

an image source for projecting an image of information indicating vehicle operating conditions toward the windshield, said image source being mounted outside a line of sight of a driver through the windshield; and a reflection plate positioned between the windshield and steering wheel to intercept and reflect the entire projected image of information over the steering wheel to the driver's line of sight;

wherein said steering column telescopes and further including a linkage between said reflection plate and said steering column arranged so as to maintain the reflection of the entire projected image over the steering wheel.

8. In a vehicle having a steering column with a steering wheel mounted thereon and a front windshield, an operating condition display comprising:

an image source for projecting an image of information indicating vehicle operating conditions toward the windshield, said image source being mounted outside a line of sight of a driver through the windshield, and a reflection plate positioned between the windshield and steering wheel to intercept and reflect the entire projected image of information over the steering wheel to the driver's line of sight;

wherein said steering column pivots and telescopes, and further including a linkage between said reflection plate and steering column arranged so that said reflection plate moves with said steering column so as to maintain the reflection of the entire projected image over the steering wheel.

9. In a vehicle having a steering column with a steering wheel mounted thereon and a front windshield, an instrument panel display comprising:

an image source for projecting an image of an instrument panel indicating at least one vehicle operating condition toward the windshield, said image source being mounted on said steering column outside a line of sight of a driver through the windshield, a reflection plate positioned between the windshield and steering wheel to intercept and reflect the entire projected image over the steering wheel to the driver's line of sight, said steering column being capable of at least one of pivotable and telescoping movement; and a linkage between said reflection plate and said steering column to move said reflection plate as said steering column moves so as to maintain the reflection of the entire projected image over the steering wheel.

10. The display of claim 9 further comprising a lens system positioned between said image source and said reflecting plate.

11. The display of claim 10 wherein said lens system comprises a magnifying lens.

12. The display of claim 9 wherein said image source includes a liquid crystal display.

13. The display of claim 9 wherein said image source includes a cathode ray tube.

14. The display of claim 9 wherein said steering wheel is no greater in diameter than 12 inches.

15. The display of claim 9 in which the image source has a cross section form factor of substantially 5 inches wide by 2 inches in height.

16. The instrument panel display of claim 9 wherein said image source includes a liquid crystal display and further comprising a lens system positioned between said image source and said reflecting plate, said lens system including a magnifying lens.

17. The instrument panel display of claim 9 wherein said image source includes a cathode ray tube and further comprising a lens system positioned between said image source and said reflecting plate, said lens system including a magnifying lens.

18. The display of claim 9 wherein said image moves said reflecting plate to maintain the reflection of the entire projected image over said steering wheel at all positions of said steering column.

19. In a vehicle having a steering column with a steering wheel mounted thereon and a front windshield, an instrument panel display comprising:

an image source for projecting an image of an instrument panel indicating at least one vehicle operating condition toward the windshield, said image source being mounted on a ceiling of the vehicle and outside a line of sight of a driver through the windshield, a reflection plate positioned between the windshield and steering wheel to intercept and reflect the entire projected image over the steering wheel to the driver's line of sight, said steering column being capable of at least one of pivotable and telescoping movement; and a linkage between said reflection plate and said steering column to move said reflection plate as said steering column moves so as to maintain the reflection of the entire projected image over the steering wheel.

20. The display of claim 19 wherein said image source includes a liquid crystal display and further including a lens system positioned between said image source and said reflecting plate, said lens system including a magnifying lens.

* * * * *